US010084242B2

(12) United States Patent
Cook

(10) Patent No.: US 10,084,242 B2
(45) Date of Patent: Sep. 25, 2018

(54) LONG TERM EVOLUTION (LTE) OUTDOOR ANTENNA AND MODULE

(71) Applicant: Scott John Cook, Woodstock, GA (US)

(72) Inventor: Scott John Cook, Woodstock, GA (US)

(73) Assignee: Scott John Cook, Woodstock, GA (US)

(*) Notice: Subject to any disclaimer, the term of this patent is extended or adjusted under 35 U.S.C. 154(b) by 333 days.

(21) Appl. No.: 14/879,246

(22) Filed: Oct. 9, 2015

(65) Prior Publication Data

US 2016/0105228 A1 Apr. 14, 2016

Related U.S. Application Data

(60) Provisional application No. 62/061,916, filed on Oct. 9, 2014.

(51) Int. Cl.

| | |
|---|---|
| ***H04B 7/02*** | (2018.01) |
| ***H01Q 21/28*** | (2006.01) |
| ***H01Q 9/04*** | (2006.01) |
| *H01Q 1/24* | (2006.01) |
| *H01Q 21/20* | (2006.01) |

(52) U.S. Cl.

CPC ........... *H01Q 21/28* (2013.01); *H01Q 9/0407* (2013.01); *H01Q 1/246* (2013.01); *H01Q 21/205* (2013.01)

(58) Field of Classification Search

CPC .... H04B 7/024; H04B 7/0408; H04B 7/0608; H01Q 9/0407; H01Q 19/10; H01Q 21/28; H01Q 21/29; H01Q 1/22

See application file for complete search history.

(56) References Cited

U.S. PATENT DOCUMENTS

| | | | |
|---|---|---|---|
| 5,940,037 | A | 8/1999 | Kellerman et al. |
| 6,052,095 | A | 4/2000 | Ramanujam et al. |
| 6,218,999 | B1 | 4/2001 | Bousquet et al. |
| 6,313,798 | B1 | 11/2001 | Bancroft et al. |
| 2006/0238438 | A1 | 10/2006 | Hirtt |
| 2013/0099986 | A1 | 4/2013 | Huynh |
| 2013/0181882 | A1 | 7/2013 | Shtrom et al. |

OTHER PUBLICATIONS

PCT Search Report Application No. PCT/US2015/054860, dated Mar. 2, 2016, pp. 1-15.

*Primary Examiner* — Thanh Le

(57) ABSTRACT

A long term evolution outdoor antenna and module that provides a compact design for wide band performance is provided. In one embodiment, the antennas comprises a top element, a feed coupled to the top element, and an unbalanced communication line coupled to the feed via a bottom element, wherein a dielectric layer is formed between the bottom element and the feed.

19 Claims, 11 Drawing Sheets

LONG TERM EVOLUTION (LTE) OUTDOOR ANTENNA AND MODULE

RELATED APPLICATIONS

This application claims priority under 35 U.S.C. § 119(e) to U.S. provisional patent application Ser. No. 62/061,916, filed on Oct. 9, 2014, which is hereby incorporated by reference in its entirety.

BACKGROUND

Ultra wideband (UWB) technology in communication networks and services is becoming more popular. Some previous designs use a monopole antenna that is perpendicular to a ground plane, however, the geometry of those designs do not provide a pattern shape desired for many applications, because they have a peak at approximately 45 degrees above the horizon. As a result, for many applications those previous designs require tilting the entire antenna assembly down to move the peak closer to the horizon, and even then the peak is not at the horizon in all azimuth directions, further limiting its usefulness. However, this does not result in an efficient, cost effective, clean, and easy to implement structure. The overall volume increases, the large ground plane is cumbersome, and the design is not easily expanded to a multi-sector antenna configuration, or a high gain multi-element array configuration.

Other previous designs used printed circuit antennas, but typically have limited bandwidth capabilities, to achieve multi-band (or broad band) performance many of these printed circuit antennas use different boards for different frequency bands. This increases overall size and cost and often requires additional combining and/or splitting hardware to combine the bands which further increases cost and complexity.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to an LTE outdoor antenna and module. The design of the presently disclosed antenna provides a compact design for wide band performance. The antenna design exhibits excellent patterns, good gain and positive gain slope to help compensate for cable loss at high frequencies. The antenna design also provides good separation and isolation between primary and secondary antennas for multiple input multiple output (MIMO) applications.

The antenna design provides flexibility and allows for various multi-sector configurations as well has high gain, high directive, multi-element array configurations. Multi-sector configurations allow for auto-beam peaking during installation and can improve coverage by allowing the antenna to choose the best signal from various directions (e.g., from various cell towers) when coupled with appropriate switching and optimization algorithms. The configurations may vary from a short single level with dual (or multilevel), to stacked dual (or multilevel) with a twist. The twist dual level stacked configuration where the bottom layer is rotated relative to the top level offers this improved multi sector performance in a tall narrow sleek stacked configuration when coupled with appropriate switching.

High directivity multi-element array configurations can greatly increase the performance and range of the antenna system by increasing the antenna gain in the desired direction (for a particular signal direction or tower). The antenna design can support over 110% bandwidth, where bandwidth "BW" is defined as $BW=(F_{high}-F_{low})/((F_{high}\times F_{low})/2)$, where $F_{high}$ is the highest frequency and $F_{low}$ is the lowest frequency of operation. So a single implementation of the present antenna design can cover all wireless (LTE, PCS, cellular etc.) bands from 698 to 2400 GHz including but not limited to 2, 4, 5, 13, and 17). The design of the present disclosure can be scaled to work over lower, or higher frequencies, and can be used for any number of applications.

Figure 1:
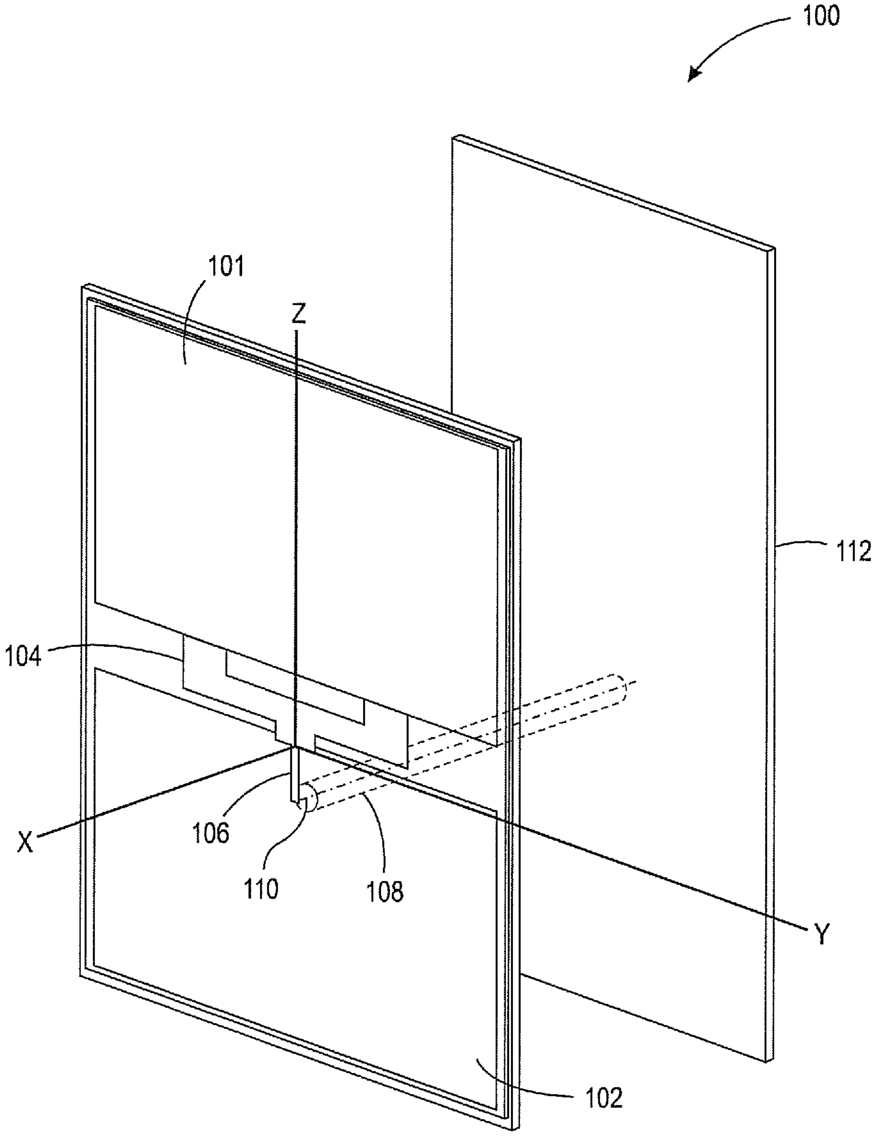
FIG. 1 illustrates an isometric view of an example of an antenna of the present disclosure.

FIG. 1 illustrates an isometric view of an example of one embodiment of an antenna 100 designed with the advantages and performance improvements discussed above. In one embodiment, the antenna 100 includes a top element 101, a bottom element 102, a feed 104, an unbalanced communication line 108 (e.g., a coaxial cable), a micro-strip 106, a jacket 108 of the unbalanced communication line 110, and a reflector 112.

In one embodiment, the top element 101 and the bottom element 102 may be wide band elements. In another embodiment, the top element 101 and the bottom element 102 may be used with a balanced transmission line.

Figure 6:
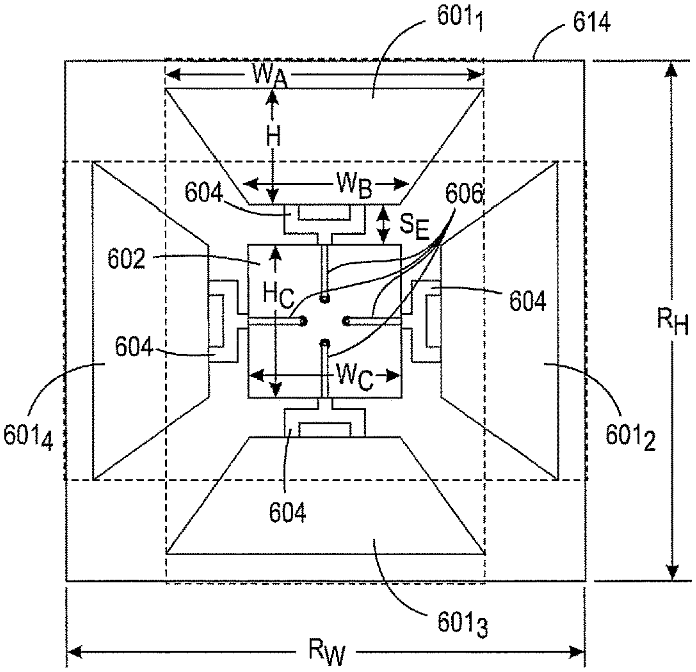
FIG. 6 illustrates a front view of another example of an antenna of the present disclosure.
Figure 7:
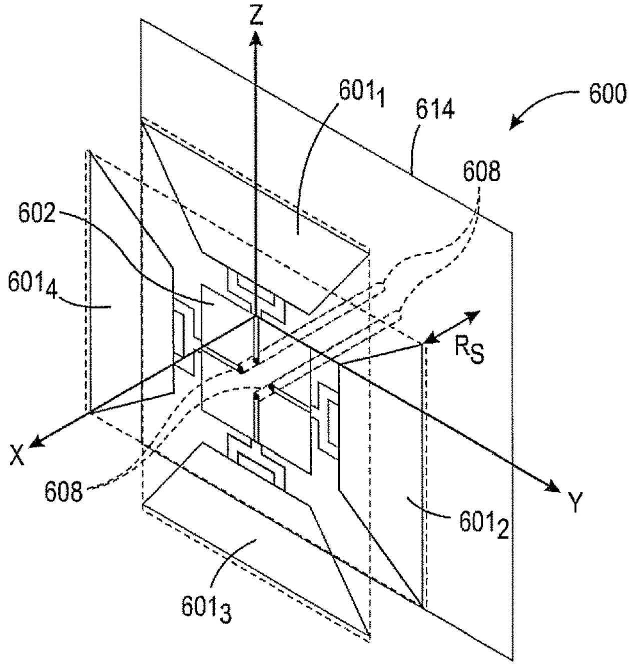
FIG. 7 illustrates an isometric view of another example of an antenna of the present disclosure.

It should be noted that the term "top" and "bottom" are only used as labels and should not be read as requiring the element 101 and 102 to be positioned in a particular way. For example, the top element 101 and the bottom element 102 may be aligned side by side at a 45 degree angle or a 90 degree angle. In one embodiment, the "top" element 101 may be arranged on all sides of the "bottom" element 102 in certain configurations as shown in FIGS. 6 and 7 and discussed below. In other words, the top element 101 and the bottom element 102 could also be referred to as a first element 101 and a second element 102.

To improve or increase bandwidth most embodiments of the present disclosure have a top element 101 and a bottom element 102 that are substantially wider than conventional dipole antennas. To further improve or increase bandwidth, in most embodiments of the present disclosure the top element 101 is fed from more than one location that distributes the currents and resulting field more uniformly across these wider elements. For many embodiments of the present disclosure a bottom edge of a multi-feed is kept relatively close to a top of the bottom element 102 resulting in good current and field distributions on both the top element 101 and the bottom element 102, which in turn improves performance over a broader frequency band.

In one embodiment, a center pin of the unbalanced communication line 110 is connected to the micro-strip 106 via the bottom element 102. The micro-strip 106 feeds up to the bottom portion of the top element 101 via the feed 104. The micro-strip 106 may be an etched line or a trace. The design of the antenna 100 allows the unbalanced communication line 110 or any other unbalanced transmission line to be used without the need of a balun.

In one embodiment, the unbalanced communication line 110 may be connected at approximately 90 degrees (e.g., perpendicular or at a right angle to a portion of the bottom element 102). In another embodiment, the unbalanced communication line 110 may be connected on a portion of the bottom element 102 (e.g., at approximately 180 degrees). In other words a portion of the unbalanced communication line 110 may run parallel to a side of the bottom element 102.

In one embodiment, the unbalanced communication line 110 may be connected directly to the feed 104. In other words, the micro-strip 106 may be an optional component and may be removed. In one embodiment, the center pin of the unbalanced communication line 110 may be soldered to a top edge of the bottom element 102 and connected to the feed 104. In another embodiment, the center pin of the unbalanced communication line 110 may be soldered to a semi-circle in the top edge of the bottom element and connected to the feed 104. In yet another embodiment, the center pin of the unbalanced communication line 110 may pass through a hole or opening in the bottom element 102 and be connected to the feed 104.

In one embodiment, the bottom element 102 may be offset, but still parallel to, the top element 101 and the center pin of the unbalanced communication line 110 may be soldered to the feed 104. In another embodiment, the bottom element 102 and the top element 101 may be on a same plane and the center pin of the unbalanced communication line 110 may be bent and soldered to the feed 104 when the unbalanced communication line 110 is connected along an edge. Alternatively, when the unbalanced communication line 110 is connected to the bottom element 102 at 90 degrees, the center pin fit through a hole in the bottom element 102, bent and soldered to the feed 104.

In one embodiment, the unbalanced communication line 110 may be connected to the feed 104 via printed circuit board with a board dielectric at 90 degrees. In one embodiment, the top element 101 and the bottom element 102 may be on a same side of the printed circuit board and the unbalanced communication line 110 may be connected through the bottom element 102 and the printed circuit board and connected to the top element 101 via a metal trace and a via in the printed circuit board. In another embodiment, the top element 101 may be on an opposite side of the printed circuit board as the bottom element 102. A short metal extension may be added to the feed 104 that connects to the unbalanced communication line 110 that is connected to the bottom element 102 and through the printed circuit board.

Figure 9:
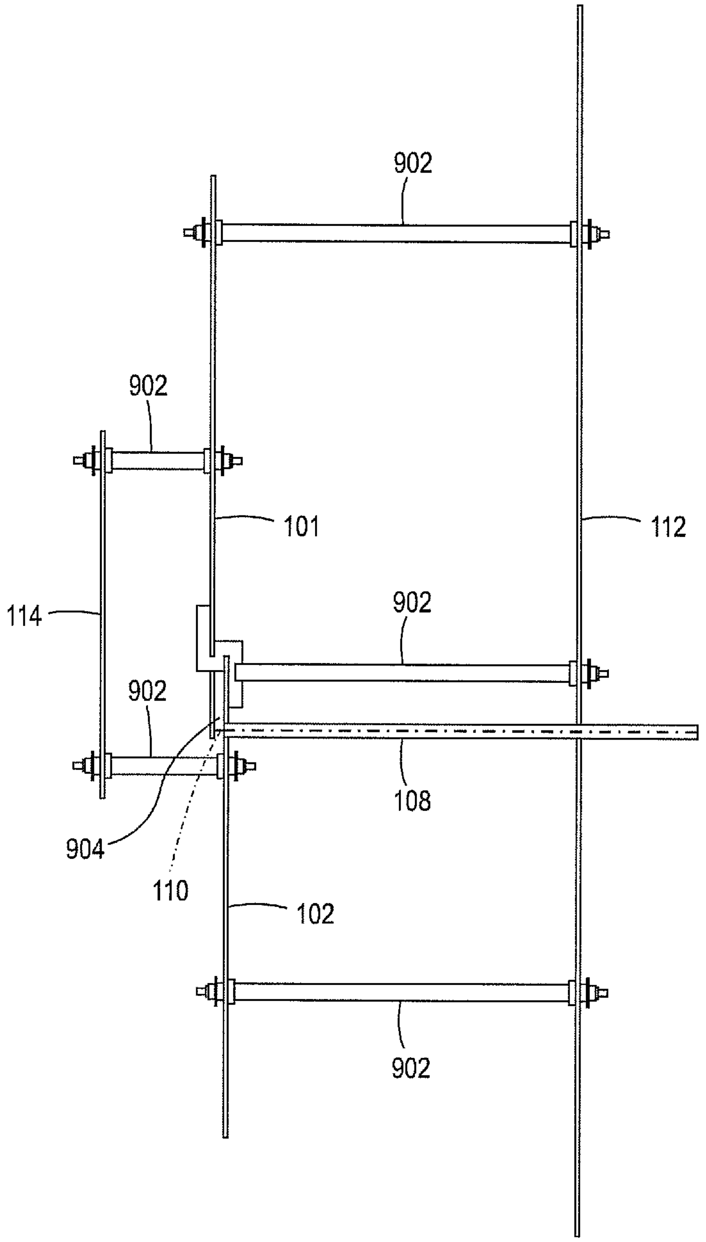
FIG. 9 illustrates a side view of the antenna with plastic standoffs.

In one embodiment, the jacket 108 may stop at a backside of the bottom element 102 as illustrated in FIG. 9. FIG. 9 also illustrates a non-conductive area 904 that may be located between the bottom element 102 and the feed 104 and/or the micro-strip 106. In one embodiment, the non-conductive area 904 may be an air gap or may be a dielectric layer in a printed circuit board. The bottom element 102 may serve as a ground layer for the micro-strip 106.

In one embodiment, the feed 104 may be a dual feed as illustrated in FIG. 1. However, it should be noted that the feed 104 may be single feed, a triple feed, or any other number of feeds. Varying the number of feeds may vary the performance of the antenna 100. For example, feeding the top element 101 at more than one point (e.g., a dual feed, a triple feed, and the like) may further improve bandwidth.

In one embodiment, the top element 101, the feed 104 and the micro-strip 106 may be stamped from a single piece of metal. In other words, the top element 101, the feed 104 and the micro-strip 106 may be directly connected to one another. In one embodiment, the top element 101, the feed 104 and the micro-strip 106 may be etched on one side of a printed circuit board.

In another embodiment, the top element 101, the feed 104 and the micro-strip 106 may be combined from different pieces of metal. In other words, the top element 101, the feed 104 and the micro-strip 106 may be directly or indirectly coupled together as separate pieces of metal via an adhesive, soldering, brackets, and the like.

In one embodiment, the top element 101, the bottom element 102 and the feed 104 may be parallel. In one embodiment, the top element 101 and the bottom element 102 may be parallel on a same plane or share a common plane. For example, the feed 104 may be bent or curved to allow the top element and the bottom element to be parallel on the common plane.

In another embodiment, the top element 101 and the bottom element 102 may be angled towards a transmit direction of the antenna 100. In addition, the reflector 112 may also be bent or angled similar to the angled top element 101 and the angled bottom element 102. In other words, one side of the top element 101 and the same side of the bottom element may be angled towards each other at an angle that is less than 180 degrees. For example, the 180 degrees may be relative to the "z" axis illustrated in FIG. 1. The top element 101 and the bottom element 102 may be tilted towards each other. In other words, the edges of the top element 101 and the bottom element 102 from a side view would appear to form a "V".

Figure 2:
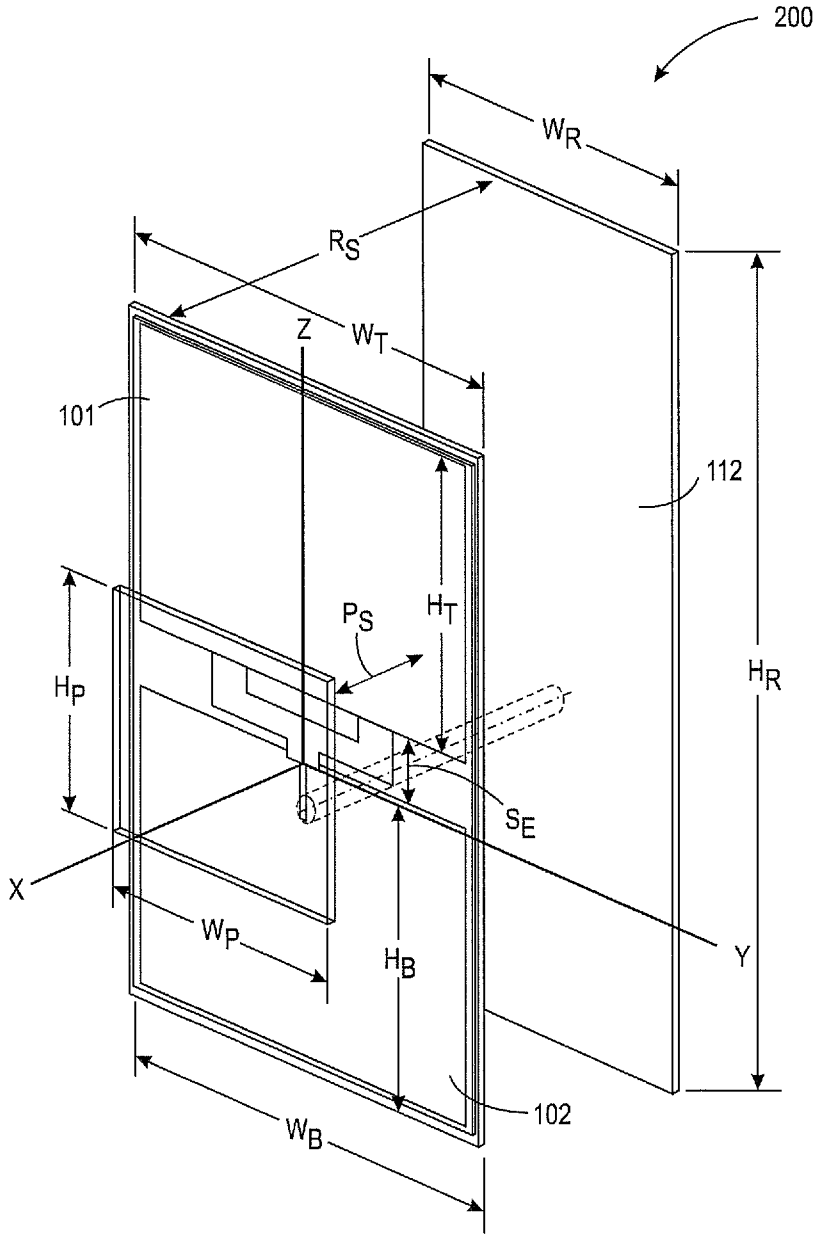
FIG. 2 illustrates an isometric view of another example of an antenna of the present disclosure.

FIG. 2 illustrates an isometric view of another example of the antenna 200 of the present disclosure. FIG. 2 illustrates the antenna 200 with a patch 114. In one embodiment, the reflector 112 may be located on one side of the top element 101 and the bottom element 102. The reflector 112 may be parallel to the top element 101 and the bottom element 102. In one embodiment, the top element 101, the bottom element 102, the reflector 112 and the patch 114 may be coupled together with plastic stand-offs 902 illustrated in FIG. 9.

In one embodiment, the patch 114 may be located on another side of the top element 101 and the bottom element 102 that is opposite the one side where the reflector 112 is located. The patch 114 may be parallel to the top element 101, the bottom element 102 and the reflector 112. In other words, the top element 101, and the bottom element 102 may be located between the reflector 112 and the patch 114.

In one embodiment, the patch 114 further improves bandwidth. The presence of the patch 114 allows the top element 101, the bottom element 102 and the reflector 112 to grow in size in order to support even lower frequencies, while at the same time maintaining, and even extending, the upper frequency of operation.

For example, without the patch 114, increasing the size of the top element 101, the bottom element 102 and the reflector 112 would naturally lower (or decrease) the lower frequency of operation. However, the higher frequency of operation would suffer because at higher frequencies the oversized elements become overmoded. Portions of the electric fields near the top element 101, the bottom element 102 and the reflector 112 may start to become out of phase with other portions. The bigger the elements become, or the higher the frequency, the more out of phase portions of the fields become. This greatly degrades the pattern performance at the higher frequencies. Adding the patch 114 brings most portions of the fields back into phase at the higher frequencies and improves high frequency operation, while having little effect at the lower frequencies.

In one embodiment, the top element 101, the bottom element 102, the feed 104, the reflector 112 and the patch 114 may be fabricated from a metal. In one embodiment, the metal may be any conductive metal, such as, a copper, aluminum with a thin film of copper, and the like. In one embodiment, the top element 101, the bottom element 102, the feed 104, the reflector 112 and the patch 114 may be the same metal or may be different metals. In one embodiment, the top element 101, the bottom element 102, the feed 104, can be thin metal layers of a printed circuit board.

In one embodiment, although the top element 101, the bottom element 102, the reflector 112 and the patch 114 are illustrated as being a rectangular shape, it should be noted that the top element 101, the bottom element 102, the reflector 112 and the patch 114 may be any shape. In addition, the top element 101 and the bottom element 102 may be different shapes. A wide variety of shapes included but not limited to multi-sided polygons, circular, elliptical, or hybrid shapes (combinations of portions of various shapes) may also be within the scope of the present disclosure.

Figure 3A:
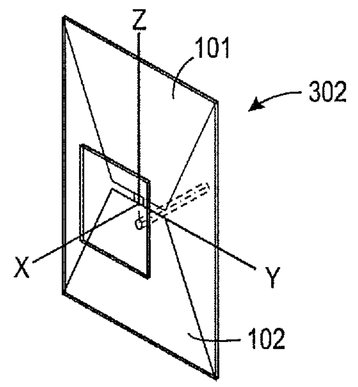
FIGS. 3A-3G illustrate examples of different element shapes.
Figure 3B:
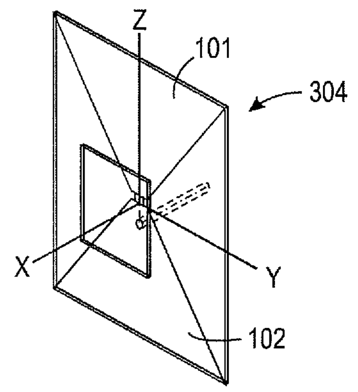
Figure 3C:
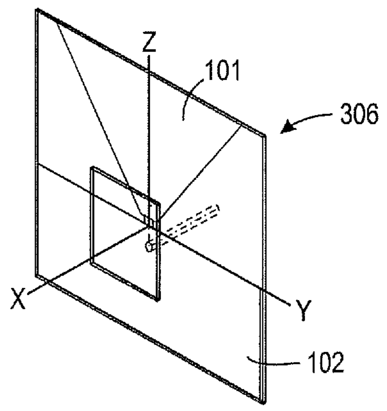
Figure 3D:
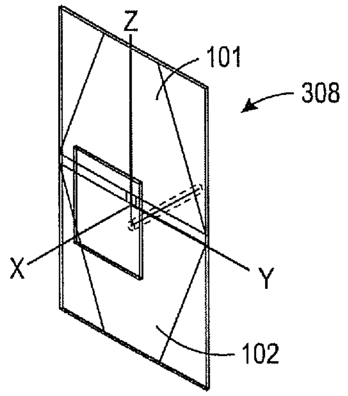
Figure 3E:
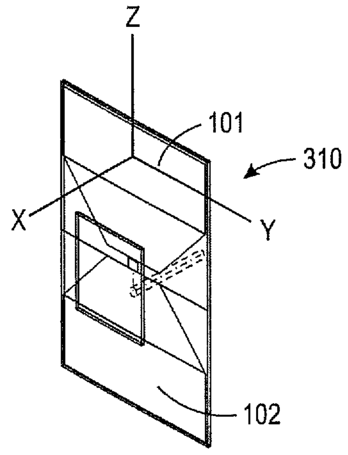
Figure 3F:
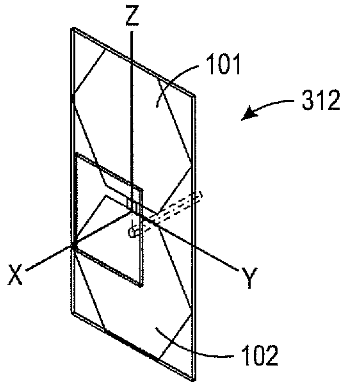
Figure 3G:
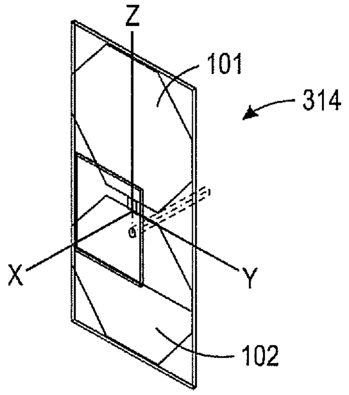

FIGS. 3A-3G illustrate a few of the various different shapes for the top element 101 and the bottom element 102 that can be deployed. For example, FIG. 3A illustrates an antenna 302 having a top element 101 and a bottom element 102 that have a trapezoid shape. FIG. 3B illustrates an antenna 304 having a top element 101 and a bottom element 102 that have a triangle shape. FIG. 3C illustrates an antenna 306 having a top element 101 and a bottom element 102 that have different shapes (e.g., a triangle shape and a rectangular shape, respectively). FIG. 3D illustrates an antenna 308 having a top element 101 and a bottom element 102 that have a trapezoid shape in opposite orientation from the trapezoid shape in FIG. 3A. FIG. 3E illustrates an antenna 310 having a top element 101 and a bottom element 102 that have a rectangular and trapezoid shape. FIG. 3F illustrates an antenna 312 having a top element 101 and a bottom element 102 that have a hexagon shape. FIG. 3G illustrate an antenna 314 having a top element 101 and a bottom element 102 that have an octagon shape. It should be noted that the shapes illustrated for the top element 101 and the bottom element 102 in FIGS. 3A-3G are examples and that other shapes (e.g., regular or irregular shapes) may be within the scope of the present invention.

Referring back to FIG. 2, the dimensions of the top element 101 (width ($W_T$) and height ($H_T$)), the bottom element 102 (width ($W_B$) and height ($H_B$)), the reflector 112 (width ($W_R$) and height ($H_R$)) and the patch (width ($W_P$) and height ($H_P$)) may be a function of a lowest frequency of operation and/or a highest frequency of operation of the antenna 100. In addition, the distance between the top element 101 and the bottom element 102 (separation or space between elements (SE)), a distance between the reflector 112 and the top element 101 and the bottom element 102 (reflector separation (RS)) and the distance between the patch 114 and the top element 101 and the bottom element 102 (patch spacing or separation (PS)) may also be a function of the lowest frequency and/or the highest frequency of operation of the antenna 100. In other words, the dimensions and distances may be selected to balance the operation at the lowest frequency and the highest frequency of operation of the antenna 100.

In one embodiment, the lowest frequency of operation may correspond to an operational wavelength (λL). In one embodiment, the highest operational frequency of operation may correspond to an operational wavelength ($\lambda_U$). In one example, the highest operation frequency ($F_U$) may be equal to 3.429 times the lowest operation frequency ($F_L$), or $\lambda_L=3.429\times\lambda_U$.

In one example, the top element 101 and the bottom element 102 have a rectangular shape that have the same dimensions (e.g., $W_T=W_B$ and $H_T=H_B$), where $H_T$ and $H_B$ are only slightly larger than $W_T$ and $W_B$, respectively. Notably, the ratios described below for the top element 101 may be the same for the bottom element 102. For example, $H_T$ may be $1.1\times W_T$ and $H_T$ may be $0.175\times\lambda_L$ and $W_T$ may be $0.1575\times\lambda_L$. In other embodiments, where the top element 101 and the bottom element 102 have substantially larger $H_T$ than $W_T$ (e.g., $H_T=2\times W_T$), then $H_T$ will increase such that $H_T$ may be $0.22\times\lambda_L$ and $W_T$ may be $0.11\times\lambda_L$.

In another embodiment, the $H_T$ may be less than $W_T$. For when $H_T$ is slightly less than $W_T$, $H_T$ may be $0.165\times\lambda_L$ and $W_T$ may be $0.1485\times\lambda_L$. For when $H_T$ is substantially less than $W_T$, $H_T$ may be $0.22\times\lambda_L$ and $W_T$ may be $0.11\times\lambda_L$.

In another embodiment, the top element 101 and the bottom element 102 may have a square shape that have $H_T=W_T$. When the top element 101 and the bottom element 102 have a square shape $H_T=W_T=0.17\times\lambda_L$. It should be noted that the values above may be approximate and vary within +/−20%.

In one embodiment, the reflector height, $H_R$, may be substantially greater than $2\times H_T$+SE. SE may vary depending upon the dimensions chose for the feed 104 and the microstrip 110. In one example, SE may be $0.028\times\lambda_L$. In another example, $H_R$ may be $0.534\times\lambda_L$ or $2\times H_T+SE+0.156\times\lambda_L$. The reflector width, $W_R$, may vary within a range of $0.001\times\lambda_L$ to $0.35\times\lambda_L$. It should be noted that the values above for the reflector dimensions may be approximate and vary within +/−30%.

In one embodiment, the reflector spacing RS may be $0.104\times\lambda_L$. The reflector spacing RS may have little effect on performance and may vary as much as +/−75% if specific size and performance trade-offs are desired for a particular application. Increasing RS typically improves performance at the lower frequencies, while degrading performance at the higher frequencies. Decreasing RS results in a shallower or smaller overall antenna size and typically improves the performance at the higher frequencies, but degrades performance at the lower frequencies.

As discussed below with reference to FIGS. 5-7, the antenna 100 may be combined for high gain applications. The reflector 112 can be shared by multiple antennas 100 and can be very large, e.g., $0.5\times\lambda_L$ for both $H_R$ ad $W_R$. In addition, in other embodiments, the reflector 112 may be a large bent structure with extra area on the top, bottom and/or sides of the reflector 112.

In one embodiment, the patch height, $H_P$, may be $0.417\times\lambda_U$ or $0.122\times\lambda_L$. In one embodiment, the patch width, $W_P$, may be $0.352\times\lambda_U$ or $0.103\lambda_L$. It should be noted that the values above for the patch dimensions may be approximate and vary within +/−30% to 50% depending on the values of $H_T$, $H_B$, $W_T$, $W_B$ and SE and the exact performance requirements of the antenna 100.

In one embodiment, the patch spacing, PS, between the patch 114 and the top element 101 and the bottom element 102 may be $0.138\times\lambda_U$. It should be noted that the values above for the patch spacing may be approximate and vary within +/−40% depending on the performance requirements of the antenna 100.

The appropriate distance between the reflector 112 and the patch 114 behind or in front of the top element 101 and the bottom element 102, respectively, helps to improve performance (e.g., patterns and directive) over a wider bandwidth. As bandwidth increases the patch 114 helps compensate for electrical size of the element being too large at the higher frequencies. Without the patch 114, the top element 101 and the bottom element 102 radiate reasonably well; however, as the size of the top element 101 and the bottom element 102 are increased in an attempt to increase the performance it will not radiate in the desired direction at higher frequencies.

The elements 101 and 102 by itself becomes oversized at the higher frequencies and the patterns begin to spoil such that the peak is no longer on the horizon but instead above and below the horizon due to some portions of the currents on the element becoming substantially out of phase. The addition of the patch 114 compensates for this by bringing the fields near the elements 101 and 102 and the patch 114 back in phase, resulting in the peak staying on the horizon as desired at the higher frequencies. The patch 114 improves performance and widens the frequency range of an antenna that includes the top element 101 and the bottom element 102. The patch 114 also improves performance and increases the bandwidth of an antenna that includes a top element 101, a bottom element 102 and a reflector 112.

Figure 4A:
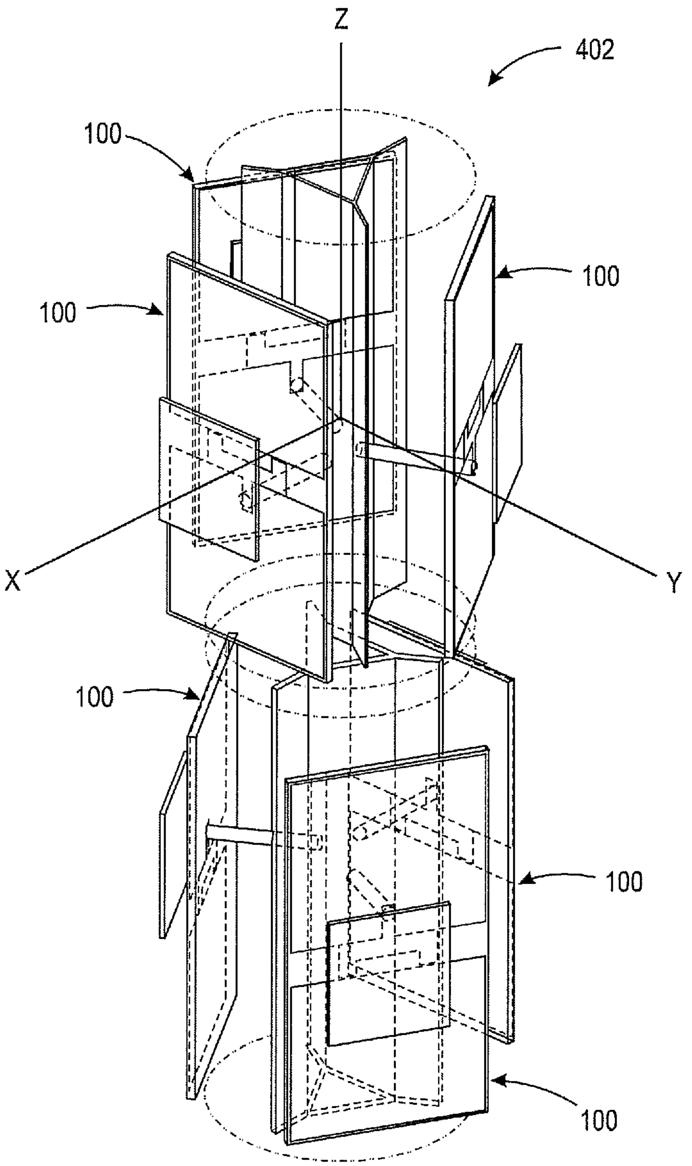
FIGS. 4A-4C illustrate examples of different antenna configurations.
Figure 4B:
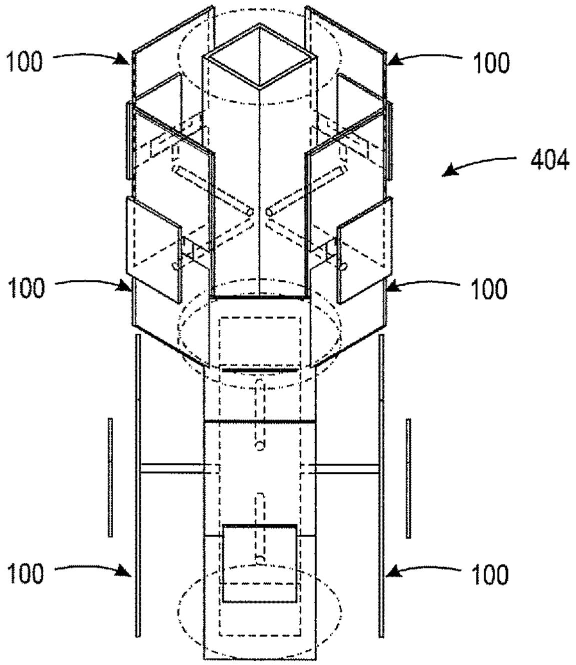
Figure 4C:
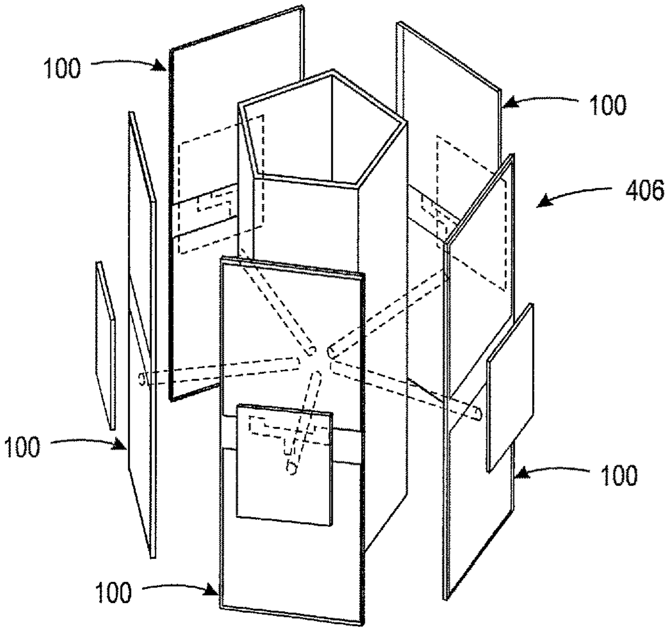

In one embodiment, multiple antennas 100 may be arranged in a variety of different configurations. FIGS. 4A-4C illustrate example configurations of multiple antennas 100. In FIG. 4A, illustrates a triple dual stack twist arrangement 402 of a plurality of antennas 100. For example, the three antennas 100 may be arranged at 120 degrees in a top stack and a bottom stack. The direction of the three antennas 100 in the top stack may be offset from the three antennas 100 in the bottom stack. The triple dual stack twist arrangement 402 may provide a taller but narrow, sleek design with improved performance over sectors.

FIG. 4B illustrates a quad dual stack twist arrangement 404 of a plurality of antennas 100. For example, four antennas 100 may be arranged at 90 degrees in a top stack and two antennas 100 may be arranged at 180 degrees in a bottom stack. The quad dual stack twist may provide improved performance at sector edges, but at increased cost and size.

FIG. 4C illustrates a penta arrangement 406 of a plurality of antennas 100. For example, five antennas may be arranged in a pentagon in a single stack. The penta arrangement 406 may provide a short but wide design. It will be appreciated that FIGS. 4A-4C illustrate a few example embodiments and other configurations and number of stacks may be within the scope of the present disclosure.

In one embodiment, the arrangements 402, 404 or 406 may be enclosed in a housing and connected to an external portion of a home. For example, the housing containing the arrangements 402, 404 or 406 may be placed outdoors and connected to a roof or siding of a home.

Figure 5:
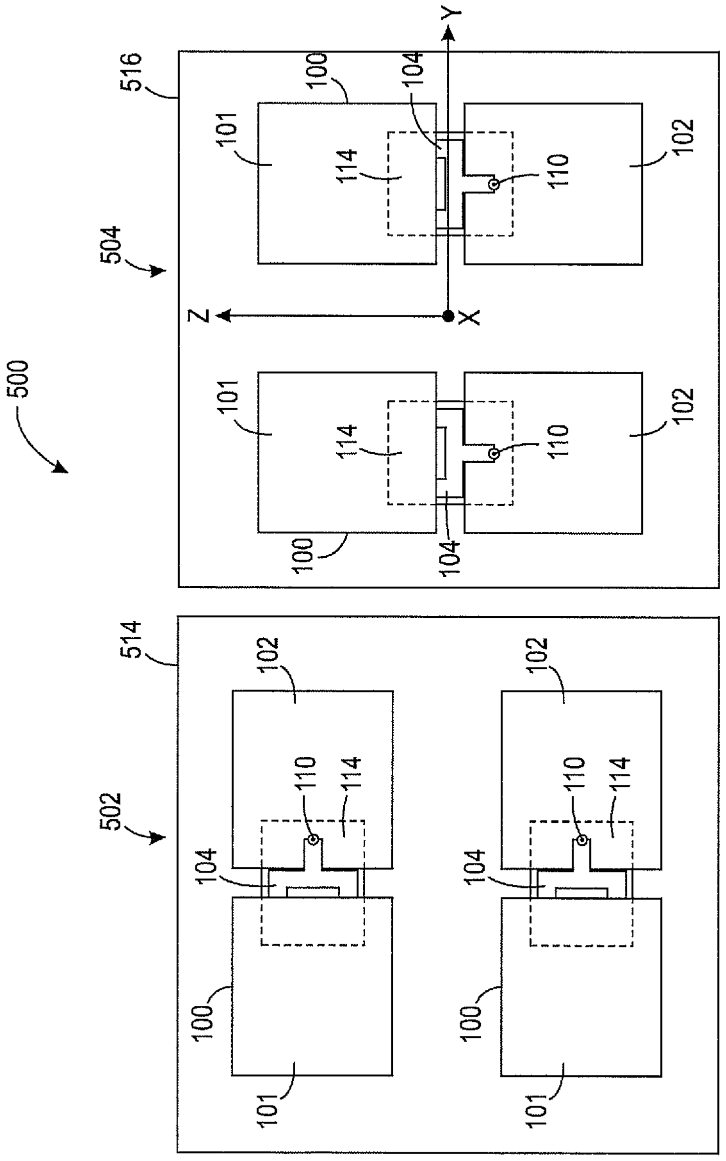
FIG. 5 illustrates a front view of another example of an antenna of the present disclosure.

FIG. 5 illustrates a front view of another example of an antenna or antenna system 500 of the present disclosure. The antenna 500 may be a high gain antenna. The antenna 500 may include a vertical polarity portion 504 and a horizontal polarity portion 502. In one embodiment, the vertical polarity portion 504 may include an array of a plurality of antennas 100 arranged side-by-side in a vertical orientation. In other words, the vertical polarity portion 504 may include at least two or more antennas 100. The antenna 500 may increase directivity by combining two antenna 100 that are pointing in a normally (e.g., perpendicular) same direction for each polarity. Although only two antennas 100 are illustrated in the vertical polarity portion 504, it should be noted that any number of antennas may be deployed.

In one embodiment, the horizontal polarity portion 502 may include an array of a plurality of antennas 100 arranged side-by-side in a horizontal orientation (e.g., rotated 90 degrees relative to the antennas 100 in the vertical orientation). In other words, the horizontal polarity portion 502 may include at least two or more antennas 100. Although only two antennas 100 are illustrated in the horizontal polarity portion 502, it should be noted that any number of antennas may be deployed.

In one embodiment, a vertical polarity reflector 516 may be coupled to one side of the at least two antennas 100 of the vertical polarity portion 504. A horizontal polarity reflector 514 may be coupled to one side of the at least two antennas 100 of the horizontal polarity portion 502. In one embodiment, the patch 114 of each one of the antennas 100 of the vertical polarity portion 504 and the horizontal polarity portion 502 may be coupled to another side of each one of the antennas 100 opposite the vertical polarity reflector 516 and the horizontal polarity reflector 514.

Each one of the antennas 100 may also include a top element 101, a bottom element 102, a feed 104 coupled to a micro-strip 106, an unbalanced communication line 110 and a patch 114 similar to the antenna 200 in FIG. 2. In one embodiment, the top element 101 and the bottom element 102 may be coupled to the feed 104. In one embodiment, the unbalanced communication line 110 may be coupled to the micro-strip 106, through the bottom element 102, at a right angle.

Although the vertical polarity portion 504 and the horizontal polarity portion 502 are illustrated as being side by side to one another, it should be noted that the vertical polarity portion 504 and the horizontal polarity portion 502 may be arranged at other angles (e.g., 45 degrees relative to one another, or coupled at a corner, and the like).

FIG. 6 illustrates a front view of another example of an antenna 600 and FIG. 7 illustrates an isometric view of the antenna or antenna system 600. The antenna 600 may also be a high gain antenna with a vertical polarity portion 620 shown by dashed lines and a horizontal polarity portion 630 shown by dashed lines. In one embodiment, the antenna 600 may have an “X” shape. In one embodiment, the vertical polarity portion 620 and the horizontal polarity portion 630 may be parallel on a common plane. The vertical polarity portion 620 and the horizontal polarity portion may be fabricated from a metal.

In one embodiment, each antenna may have a different top element $\mathbf{601_1}$ to $\mathbf{601_4}$, a bottom element 602, a feed 604 coupled to a micro-strip 606 and an unbalanced communication line 608. In one embodiment, the top elements $\mathbf{601_1}$ to $\mathbf{601_4}$ and the bottom element 602 may be coupled to a respective feed 104. In one embodiment, the unbalanced communication line 608 may be coupled to the micro-strip 606, through the bottom element 602, at a right angle.

In one embodiment, the top element $\mathbf{601_1}$, the top element $\mathbf{601_3}$ and the bottom element 602 comprise the vertical polarity portion 620. In one embodiment, the top element $\mathbf{601_2}$, the top element $\mathbf{601_4}$ and the bottom element 602 comprise the horizontal polarity portion 630.

In one embodiment, the vertical polarity portion 620 and the horizontal polarity portion 630 may share a single reflector 614. In addition, the vertical polarity portion 620 and the horizontal polarity portion 630 may share the single bottom element 602. Said another way, the top elements $601_1$ to $601_4$ share the bottom element 602 as a ground.

The shape of the bottom element 602 may be different from the shape of the top elements $601_1$ to $601_4$. For example, the bottom element 602 may be a square and the top elements $601_1$ to $601_4$ may be a trapezoid. In one embodiment, the trapezoid shape of the top elements $601_1$ to $601_4$ help support a lowest frequency (making it electrically large enough), while keeping height of the top elements $601_1$ to $601_4$ relatively small.

In one embodiment, the top elements $601_1$ to $601_4$ may each have the same dimensions of first width (WA), a second width ($W_B$) and a height (H) of the trapezoid. The dimensions of the bottom element 602 may include a width (WC) and a height (WH). The dimensions of the reflector may include a width (RW) and a height (RH). A spacing (RS) may be defined as a distance between the elements $601_1$ to $601_4$ and 602 and the reflector 614. A spacing (SE) may be defined as distance between each one of the top elements $601_1$ to $601_4$ and the bottom element 602.

In one embodiment, the dimensions of the top elements $601_1$ to $601_4$, the bottom element 602 and the reflector 614 may be a function of a lowest frequency of operation ($F_L$) and its corresponding operational wavelength ($\lambda_L$) and/or a highest frequency of operation ($F_U$) and its corresponding operational wavelength ($\lambda_U$) of the antenna 600. In one embodiment, the spacing or distance between the reflector 614 and the top elements top elements $601_1$ to $601_4$ and the bottom element 602 may also be a function of the lowest frequency of operation and/or the highest frequency of operation of the antenna 600. In one example, $F_u$=3.429×$F_L$ (or $\lambda_L$=3.429×$\lambda_u$) resulting in nearly 110% bandwidth.

In one embodiment, the dimensions for the top elements $601_1$ to $601_4$ may be $H=0.1008\times\lambda_L=0.3457\times\lambda_u$, $WA=0.3262\lambda_L=1.118\lambda_u$, and $W_B=0.1586\lambda_L=0.544\lambda_u$. In one embodiment, the dimensions for the bottom element 602 may be $WC=HC=0.1601\times\lambda_L=0.5490\times\lambda_u$. In one embodiment, RS may be equal to $0.104\times\lambda_L$. It should be noted that the values above for the dimensions of the top elements $601_1$ to $601_4$ and the bottom element 602 may be approximate and vary within +/−20%.

In one embodiment, RH may be equal to RW. In addition, RH and RW may be substantially greater than 2×H+2×SE+HC. In one embodiment, SE may be equal to $0.396\times\lambda_L$. In one embodiment, $RH=RW=0.534\times\lambda_L=2\times H+2\times SE+0.0928\times\lambda_L$. It should be noted that the values above for the reflector dimensions may be approximate and vary within +/−30%.

For high gain applications, several of antennas 600 can be placed in an array, in which case, they can share a single very large (wide and/or tall) reflector 614 that can be much greater than $0.5\times\lambda_L$ in both RH and WH.

In other embodiments, the reflector 614 can be a bent structure with extra area on the top bottom and/or sides, and the top, bottom, left and right portions can be angled (in a different plan than the center portion), and can be different shapes (square, slotted, etc.). The top and bottom can be a different shape from the left and right portions. It is even possible for the top to be a different shape than the bottom portion and for the left to be different from the right if symmetry must be sacrificed for other reasons (packaging constraints, etc.), or if a somewhat asymmetric field pattern is desired.

For embodiments that have top elements $601_1$ to $601_4$ that are considerable narrower (than shown in FIGS. 6 and 7) the height may be increased. For embodiments that have top elements $601_1$ to $601_4$ that are considerable wider (than shown n FIGS. 6 and 7) the height may be decreased.

Previous designs use a basic radiating element perpendicular to the ground plane, which does not provide the pattern shape desired for many applications. Many previous designs have the peak at approximately 45 degrees above the horizon. As a result, previous designs (i.e., coupled with a reflector also above the ground plane) require tilting the entire antenna assembly down to move the peak closer to the horizon. However, this does not result in a cost effective clean easy to implement structure. The overall volume increases, the large ground plane is cumbersome and the design is not expanded to a multi-sector antenna configuration. In contrast, the present disclosure uses a dual and tri-feed approach in more of a vertical dipole like structure that is more naturally symmetric to achieve peak radiation in the desired direction (e.g., the horizon).

The embodiments of the present disclosure may also include a module (not shown) that may be used in a router in communication with the antenna designs disclosed herein. The module may provide switching control and direct current (DC) to the antenna over the unbalanced communication line 108. In one embodiment, the module may include a radio frequency (RF) input, an RF output, one or more regulators, an MCU and a low loss RF bias Tee. The module may also include a processor and computer readable memory for storing the control algorithms for switching the antenna.

In one embodiment, the switching algorithms may be used to control a plurality of antennas in communication with a primary switch and a secondary switch. In one embodiment, the primary switch may comprise a six way switch and the secondary switch may comprise a 6 way or a 7 way switch. In one embodiment, the primary switch may be used for transmission and reception and the second switch may be used only for reception via a coaxial cable connection. In one embodiment, an amplifier may be coupled to a secondary path of the secondary switch for the reception path only.

In one embodiment, a method using a minimal switch state for performing an optimization sequence may be performed. In one embodiment the minimal switch state may comprise 2n−1 states for an "n" sector antenna configuration.

In one embodiment, the secondary switch may be connected to a load, while the primary switch cycles through each one of the plurality of antennas. For example, if six antennas are deployed, the primary switch may cycle through each one of the six antennas to find the best signal. A switch state for the primary switch is then selected with the highest signal quality out of the six antennas. Then, the secondary switch cycles through the remaining 5 antennas to find the best combined signal. The secondary switch may then select a switch state with the highest signal quality out of the 5 remaining antennas.

In one embodiment, a method using a maximum switch state for performing an optimization sequence may be performed. In one embodiment, the minimal switch state may comprise n×(n−1) states for an "n" sector antenna configuration.

Figure 8:
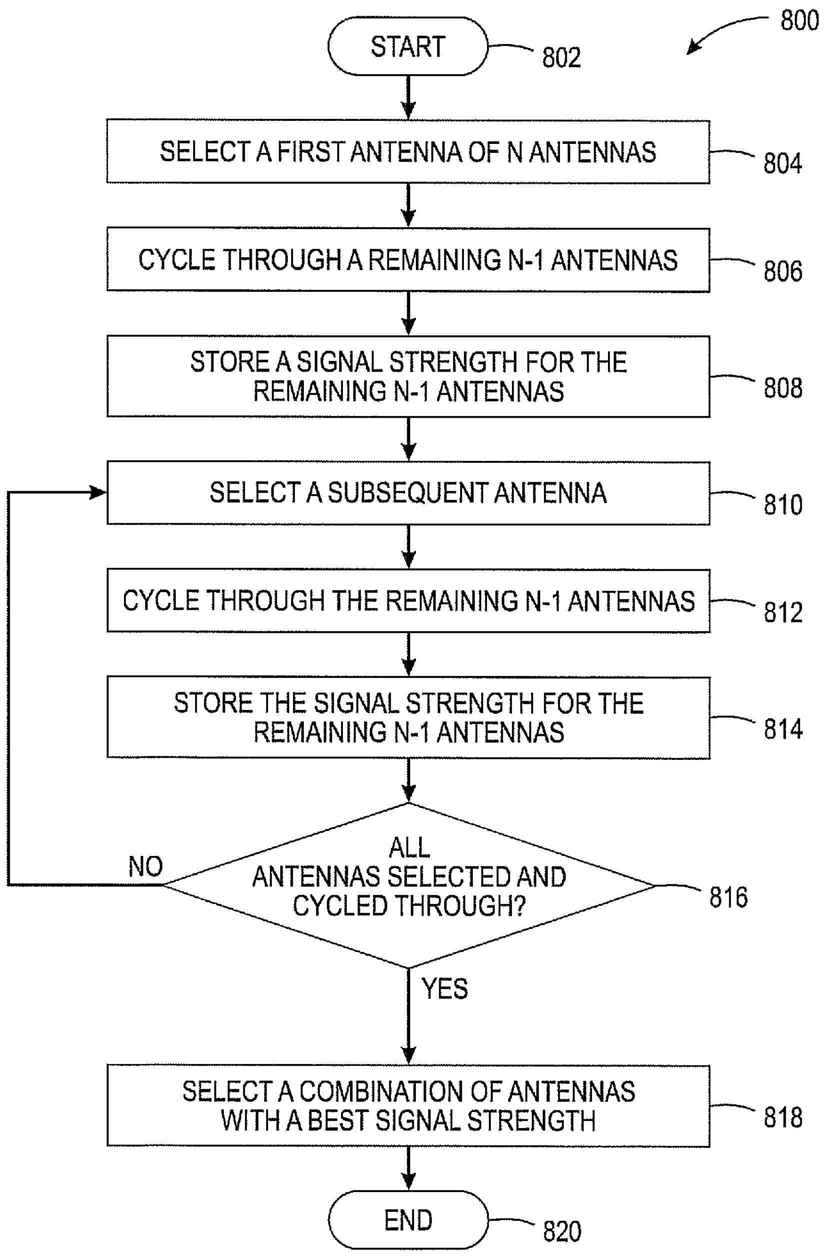
FIG. 8 a flow chart of an example method for optimizing a performance of an antenna.

FIG. 8 illustrates a flow chart of an example method 800 for performing an optimization sequence for a plurality of antennas (e.g., the antennas 402, 404 and 406 illustrated in FIG. 4) using the maximum switch state. In one embodiment, the method 800 may be performed by the module or a processor within the module that is in communication with the antenna system.

At block 802, the method 800 selects a first antenna of n antennas. For example, a primary switch may select a first antenna.

At block 804, the method 800 cycles through a remaining n−1 antennas. For example, while the primary switch has the first antenna selected, a secondary switch may cycle through the remaining antennas. Using an example with 6 antennas, the primary switch selects a first antenna and the secondary switch cycles through antennas 2-6. "Cycling" may be defined to be measuring a signal strength of each antenna.

At block 808, the method 800 stores a signal strength for the remaining n−1 antennas.

At block 810, the method 800 selects a subsequent antenna. For example, after antennas 2-6 have been cycled, the primary switch may select the second antenna.

At block 812, the method 800 cycles through the remaining n−1 antennas. For example, while the primary switch has the second antenna selected, the secondary switch may cycle through antennas 1 and 3-6.

At block 814, the method 800 stores the signal strength for the remaining n−1 antennas.

At block 816, the method 800 determines if all the antennas have been selected and cycled through. In other words, the method 800 has the primary switch select the third antenna and the secondary switch cycles through antennas 1, 2 and 4-6, and so forth. This pattern may be repeated for all 30 states. If the answer to block 816 is no, the method 800 may return to block 810 and blocks 810-816 may be repeated until all antennas have been selected by the primary switch and cycled through by the secondary switch.

If the answer to block 816 is yes, the method 800 may proceed to block 818. At block 818, the method 800 selects a combination of antennas with a best signal strength. Using the above example with six antennas, the module, or processor, can determine the best combination with the best signal strength of the 30 combinations is selected. At block 820, the method 800 ends.

It should be noted that although not explicitly specified, one or more steps, functions, or operations of the method 800 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 8 that recite a determining operation, or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings. In addition, the dimensions and measurements included in the figures and attached documents are for example only and are not to be considered limiting.

What is claimed is:

1. An antenna comprising:
a top element;
a feed coupled to the top element, wherein the feed distributes current to the top element from more than one location; and
an unbalanced communication line coupled to the feed via a bottom element, wherein a non-conductive area is located between the bottom element and the feed, wherein a bottom edge of the feed is coupled to a top of the bottom element.

2. The antenna of claim 1, further comprising:
a micro-strip coupled to the feed, wherein the unbalanced communication line is coupled to the feed via a connection to the micro-strip.

3. The antenna of claim 1, further comprising:
a reflector located on one side of the bottom element and the top element, wherein the reflector is parallel to the bottom element and the top element.

4. The antenna of claim 3, further comprising:
a patch located on another side of the bottom element and the top element that is opposite the one side where the reflector is located, wherein the patch is parallel to the bottom element, the top element and the reflector.

5. The antenna of claim 4, wherein a size of the bottom element, the top element, the reflector and the patch is a function of a lowest frequency of operation.

6. The antenna of claim 4, wherein a distance between the bottom element, the top element, the reflector and the patch is a function of a lowest frequency of operation.

7. The antenna of claim 4, wherein the bottom element, the top element, the feed, the reflector and the patch comprise a metal.

8. The antenna of claim 1, wherein the bottom element, the top element and the feed are parallel.

9. The antenna of claim 8, wherein the bottom element and the top element lie on a common plane.

10. The antenna of claim 1, wherein the bottom element and bottom element are angled less than 180 degrees.

11. The antenna of claim 1, wherein the bottom element and the top element have different shapes.

12. An antenna system, comprising:
a vertical polarity portion, wherein the vertical polarity portion comprises at least two vertical antennas; and
a horizontal polarity portion, wherein the, horizontal polarity portion comprises at least two horizontal antennas, wherein the vertical polarity portion and the horizontal polarity portion are parallel, wherein the at least two vertical antennas and the at least two horizontal antennas each comprise:
a top element;
a feed coupled to the top element, wherein the feed distributes current to the top element from more than one location; and
an unbalanced communication line coupled to the feed via a bottom element, wherein a non-conductive area is located between the bottom element and the feed, wherein a bottom edge of the feed is coupled to a top of the bottom element.

13. The antenna system of claim 12, further comprising:
a vertical polarity reflector coupled to one side of the at least two vertical antennas; and
a horizontal polarity reflector coupled to one side of to the at least two horizontals antennas.

14. The antenna system of claim 13 further comprising:
a vertical polarity patch coupled on another side of each one of the at least two vertical antennas; and
a horizontal polarity patch coupled on another side of each one of the at least two horizontal antennas.

15. The antenna system of claim 12, further comprising:
a single reflector coupled to the vertical polarity portion and the horizontal polarity portion.

16. The antenna system of claim 15, wherein the bottom element is shared by the at least two vertical antennas of the vertical polarity portion and the at least two horizontal antennas of the horizontal polarity portion.

17. The antenna system of claim 15, wherein a shape of the bottom element and the top element are different.

18. The antenna system of claim 12, wherein the vertical polarity portion and the horizontal polarity portion are parallel.

19. The antenna system of claim 12, wherein the vertical polarity portion and the horizontal polarity portion comprise a metal.

* * * * *